No. 821,679. PATENTED MAY 29, 1906.
J. THOMSON.
TIRE FOR VEHICLE WHEELS.
APPLICATION FILED APR. 27, 1905.
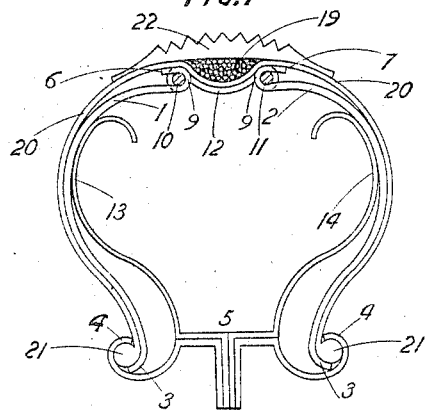
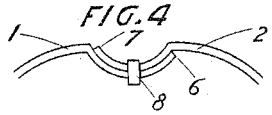
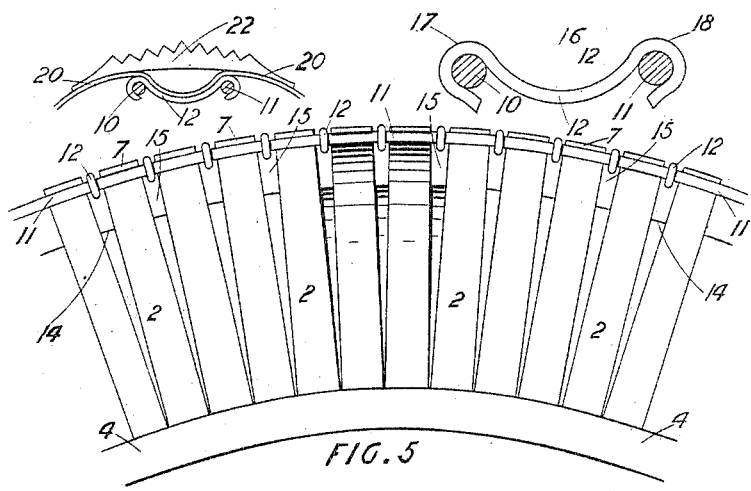
Witnesses
H. M. Kuchne
John A. Perceval
Inventor,
John Thomson
By Richard T. __, Attorneys

UNITED STATES PATENT OFFICE.

JOHN THOMSON, OF INVERCARGILL, NEW ZEALAND.

TIRE FOR VEHICLE-WHEELS.

No. 821,679.　　　　Specification of Letters Patent.　　　Patented May 29, 1906.

Application filed April 27, 1905. Serial No. 257,710.

*To all whom it may concern:*

Be it known that I, JOHN THOMSON, draper, residing at Invercargill, New Zealand, have invented certain new and useful Improvements in Tires for Vehicle-Wheels, of which the following is a specification.

This invention relates to elastic tires for vehicle-wheels other than pneumatic tires.

The object of this invention is to provide a tire that will have the durability and non-liability to puncture of a metallic tire, with the advantages of a pneumatic tire.

The tire broadly consists of a wheel rim or felly with inwardly-curved edges, supports within the tire secured to the rim, a series of transverse hook-ended substantially flat springs laid side by side to form the circumference, a pair of these springs being required to extend transversely round the tire, a rubber or flexible covering, and a tread solutioned to the covering with an elastic substance between the tread and the covering.

The springs of tires of the class described heretofore made are liable to break in the middle.

A leading feature of this invention is the construction whereby this breakage is practically obviated, as hereinafter described.

In the accompanying drawings, illustrating this invention, Figure 1 is a sectional view of the tire. Fig. 2 is a part view of the tire, showing the tread, a portion of the outer cover, the wire rings in section, and the clips. Fig. 3 is an enlarged view of the clips and wire rings. Fig. 4 is a view illustrating an alternative method of connecting the hook-ended springs at their upper ends. Fig. 5 is a segmental view, the tread and outer cover being omitted.

Instead of transverse hook-ended flat springs extending transversely in one piece from one curved edge of the rim to the other and which are liable to break there is a pair of similar hook-ended springs 1 2, one end 3 of each engaging the curved edge 4 of the rim 5 and the other ends 6 7 being connected in any suitable manner. Thus these ends 6 7 may be constructed U-shaped, Fig. 4, so as to engage each other, and a link may be slipped over them to hold them together, or each of the ends 6 7 may be constructed with a hook 9, adapted to hook over one of two wire rings 10 11, which are constructed to run round the highest part of the tire, and in this case between each pair of springs 1 2 a hook-ended clip 12 is placed to hold the wire rings 10 11 together.

Combined with the wheel rim or felly 5, which has inwardly-curved edges 4, there are inner supports 13 14 for the transverse flat hook-ended springs 1 2, which are bent round these inner supports 13 14 and retained in place by the outward pressure of their lower ends 3 against the curved edges 4 of the rim 5 and by the connection of their upper ends 6 7, as before described. These transverse springs 1 2 are of the same width and are set closely together side by side at the lower ends 3, which engage the curved edges 4 of the rim 5, so as to fill the whole circumference of the rim 5, and when in place there are intervals 15 between their adjacent portions, these intervals 15 being least at the curved edges 4 of the tire-rim 5 and greatest at the upper ends 6 7, which are connected, as before described.

When wire rings 10 11 are used, clips 12 connect them, said clips 12 having a hollow portion 16 between their ends 17 18 to receive a yielding composition 19, such as twine, solutioned and wound round the circumference in said hollow portion 16 to bind the cover 20 thereto. These rings are yielding, being made up of coiled or twisted steel strands, so that when they are in place the tire may have longitudinal resiliency.

The ends 3 of the springs 1 2, engaging the curved edges 4 of the rim 5, have a small flange or solid portion to prevent adjacent springs riding over each other.

There is a flexible outer cover 20, with thickened edges 21, adapted to be placed over the springs 1 2, so that the thickened edges 21 are introduced above the springs 1 2 and under the inwardly-curved edges 4 of the rim 5 and are retained in place by the outward pressure of the springs 1 2 against said curved edges 4 of the rim 5.

Twine 19 is wound tightly round the circumference of the tire above the elastic cover and beds itself in the hollow portion 16 of the clips which connect the wire rings 10 11 and bind the middle of the cover 20 securely to the springs. In the case where the ends of the transverse springs are connected, as illustrated in Fig. 4, the twine is wound in the U-shaped portion thereof.

The tread 22 is solutioned onto the outer cover above the yielding material or twine.

The inner supports 13 14 are extended high enough and are formed with a curved portion corresponding to that of the springs 1 2, so as to lie close to and afford support thereto for some little distance and prevent side wabble thereof.

The springs 1 2 are made the same width throughout, and consequently when in place lie apart at the top of the curve, and in the space so left the clips 12, connecting the wire rings 10 11, are placed when wire rings are used. These clips are not required when the wire rings are not used.

Having now described my invention, what I claim as new, and desire to secure by Letters Patent, is—

1. A vehicle-tire comprising in combination a tire-rim having inwardly-curved edges, a series of transverse substantially flat springs having their lower ends hooked engaging said curved edges and extending round the whole circumference of the tire-rim, means for connecting the upper ends of each pair of transverse springs, and supports secured to the tire-rim for said springs substantially as described.

2. A vehicle-tire wheel comprising in combination a tire-rim having inwardly-curved edges, a series of similar transverse substantially flat springs having their lower ends hooked engaging said curved edges and extending round the whole circumference of the tire-rim, and having their upper ends U-shaped and engaging each other, links uniting each pair of said U-shaped upper ends, and supports secured to the tire-rim for said springs, substantially as described.

3. A vehicle-tire comprising in combination a tire-rim having inwardly-curved edges, a pair of wire rings lying side by side round the tire circumference, a series of similar transverse substantially flat springs having hooked edges and extending round the whole circumference of the tire-rim their lower ends engaging said curved edges and their upper ends engaging said wire rings, curved hook-ended clips connecting said wire rings, and supports secured to the tire-rim for said transverse springs substantially as described.

4. A vehicle-tire comprising in combination a tire-rim having inwardly-curved edges, a series of similar transverse substantially flat springs having their lower ends hooked engaging said curved edges and extending round the whole circumference of the tire-rim, means for connecting the upper ends of each pair of transverse springs, supports secured to the tire-rim for said springs, an elastic tire-cover having its edges thickened secured within the curved edges of the tire-rim by the outward pressure of said springs, binding means running round the circumference of the tire securing the cover to the upper ends of the transverse springs, and a tread solutioned to said binding means and tire-cover, substantially as described.

5. In a tire for vehicle-wheels, in combination a tire-rim provided with inwardly-curved edges, transverse similar springs in pairs laid side by side round the whole circumference of the tire-rim, said springs having their lower ends hooked so as to engage the curved edges of the rim and means for connecting the upper ends of each pair of springs, substantially as and for the purposes set forth.

In witness whereof I have hereunto set my hand in presence of two witnesses.

JOHN THOMSON.

Witnesses:
  A. J. PARK,
  A. A. PARK.